US011525021B2

(12) United States Patent
Hajji et al.

(10) Patent No.: US 11,525,021 B2
(45) Date of Patent: Dec. 13, 2022

(54) COMPOSITION COMPRISING A MULTISTAGE POLYMER AND A (METH)ACRYLIC POLYMER, ITS METHOD OF PREPARATION AND ITS USE

(71) Applicant: Arkema France, Colombes (FR)

(72) Inventors: Philippe Hajji, Chatillon d'Azergues (FR); Rosangela Pirri, Montardon (FR); Rabi Inoubli, Villeurbanne (FR); Aline O. Couffin, Balsac (FR)

(73) Assignee: Arkema France, Colombes (FR)

( * ) Notice: Subject to any disclaimer, the term of this patent is extended or adjusted under 35 U.S.C. 154(b) by 14 days.

(21) Appl. No.: 16/628,287

(22) PCT Filed: Jul. 12, 2018

(86) PCT No.: PCT/EP2018/068968
§ 371 (c)(1),
(2) Date: Jan. 3, 2020

(87) PCT Pub. No.: WO2019/012052
PCT Pub. Date: Jan. 17, 2019

(65) Prior Publication Data
US 2020/0172649 A1 Jun. 4, 2020

(30) Foreign Application Priority Data
Jul. 12, 2017 (FR) .................. FR17.56647

(51) Int. Cl.
*C08F 265/06* (2006.01)
*C08L 51/00* (2006.01)
*C08F 2/22* (2006.01)
*C08F 279/02* (2006.01)

(52) U.S. Cl.
CPC .............. *C08F 265/06* (2013.01); *C08F 2/22* (2013.01); *C08F 279/02* (2013.01); *C08L 51/003* (2013.01); *C08L 2205/02* (2013.01); *C08L 2312/00* (2013.01)

(58) Field of Classification Search
CPC ................. C08L 51/04; C08F 265/06
See application file for complete search history.

(56) References Cited

U.S. PATENT DOCUMENTS

| | | | |
|---|---|---|---|
| 4,764,555 A | 8/1988 | Shigemitsu et al. | |
| 5,362,795 A * | 11/1994 | Matsumoto | C08J 3/14 |
| | | | 524/501 |
| 8,729,197 B2 | 5/2014 | Kropp | |
| 2005/0039850 A1* | 2/2005 | Benz | C08J 5/128 |
| | | | 156/309.9 |
| 2006/0069210 A1* | 3/2006 | Berzinis | C08F 265/04 |
| | | | 525/242 |
| 2007/0027233 A1 | 2/2007 | Yamaguchi et al. | |
| 2007/0027263 A1 | 2/2007 | Furukawa et al. | |
| 2009/0308534 A1 | 12/2009 | Malone | |
| 2010/0099800 A1 | 4/2010 | Ueno et al. | |
| 2011/0024039 A1 | 2/2011 | Campbell et al. | |
| 2012/0157628 A1 | 6/2012 | Navarro et al. | |
| 2015/0053844 A1* | 2/2015 | Kitamura | G02B 3/005 |
| | | | 250/208.1 |
| 2015/0147550 A1* | 5/2015 | Kitayama | C08L 33/24 |
| | | | 428/220 |
| 2017/0057285 A1* | 3/2017 | Sandstrom | C08K 3/36 |
| 2017/0369696 A1 | 12/2017 | Inoubli et al. | |
| 2018/0002520 A1 | 1/2018 | Inoubli et al. | |
| 2020/0277484 A1* | 9/2020 | Smith | C08K 3/26 |

FOREIGN PATENT DOCUMENTS

EP 0 066 382 A1 12/1982
FR 2934866 A1 2/2010

\* cited by examiner

Primary Examiner — Jeffrey C Mullis
(74) Attorney, Agent, or Firm — Lynn B. Morreale

(57) ABSTRACT

The present invention relates to a composition comprising a multistage polymer and a (meth)acrylic polymer, its process of preparation, and its use. In particular, the present invention relates to a composition comprising a multistage polymer in form of polymeric particles made by a multistage process and a (meth)acrylic polymer, while the (meth) acrylic polymer possesses a medium molecular weight. The present invention also relates to polymer composition comprising polymeric particles made by a multistage process comprising at least two stages and a (meth)acrylic polymer with a medium molecular weight, its method of preparation, its use as impact modifier in polymer compositions for composites comprising thermosetting resins or thermoplastic polymers and compositions and articles comprising it.

25 Claims, No Drawings

COMPOSITION COMPRISING A MULTISTAGE POLYMER AND A (METH)ACRYLIC POLYMER, ITS METHOD OF PREPARATION AND ITS USE

CROSS-REFERENCE TO RELATED APPLICATIONS

This application is a national stage application under 35 U.S.C. § 371 of PCT/EP2018/068968, filed Jul. 12, 2018 which claims benefit to application FR 17 56647, filed Jul. 12, 2017.

FIELD OF THE INVENTION

The present invention relates to a composition comprising a multistage polymer and a (meth)acrylic polymer its process of preparation and its use.

In particular the present invention relates to a composition comprising a multistage polymer in form of polymeric particles made by a multistage process and a (meth)acrylic polymer, while the (meth)acrylic polymer possesses a medium molecular weight.

More particularly the present invention relates to polymer composition comprising polymeric particles made by a multistage process comprising at least two stages and a (meth)acrylic polymer with a medium molecular weight, its method of preparation, its use as impact modifier in polymer compositions for composites comprising thermosetting resins or thermoplastic polymers and compositions and articles comprising it.

TECHNICAL PROBLEM

Mechanical or structured parts or articles or structural adhesives that have to absorb high stresses during their use are widely manufactured from polymeric materials. While mechanical or structured parts or articles are usually composite materials, the structural adhesives can be purely polymeric. A composite material is a macroscopic combination of two or more non miscible materials. The composite material constitutes at least of a matrix material that forms a continuous phase for the cohesion of the structure and a reinforcing material with various architectures for the mechanical properties.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, higher fracture toughness) in comparison with homogenous materials and their low density.

The most important class in view of volume in commercial industrial scale, are composites with organic matrices, where the matrix material is a generally a polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently.

In order to prepare the polymeric composite material the prepolymer is mixed with the other component such as glass beads or fibres or the other component which is wetted or impregnated and cured afterwards. Example for prepolymers or matrix material for thermoset polymers are unsaturated polyesters, vinylesters, epoxy or phenolic ones.

Thermosetting resins once cured have excellent properties in view of dimensional stability, mechanical strength, electrical insulating properties, heat resistance, water resistance and chemical resistance. Such thermosetting resins are for example epoxy resins or phenolic resins. However such cured resins have small fracture toughness and are brittle.

Thermoplastic polymers consist of linear or branched polymers, which are not crosslinked. The thermoplastic polymers can be heated in order to mix the constituents necessary (for example a fibrous substrate and thermoplastic polymer for matrix) for producing the composite material and to be cooled for setting. The wetting or correct impregnation of the fibers by the thermoplastic polymer can only be achieved, if the thermoplastic resin is sufficiently fluid.

Another way for impregnating the fibrous substrate is to dissolve the thermoplastic polymer in an organic solvent or using a syrup based on monomers or a mixture or monomers and polymers.

In order to guarantee and obtain a satisfying mechanical performance over a large temperature range, the impact performance of the thermoplastic polymer matrix has to be increased.

Usually impact modifiers in form of core-shell particles are made by a multistage process, with at least stage comprising a rubber like polymer. Afterwards the particles are incorporated in the brittle polymers for composite material or the one of the phases for the structural adhesives, in order to increase the impact resistance of the finished product.

However these kind of multistage polymers are not easy to disperse in all kind of resins or polymers, especially in a homogenous distribution and/or in important quantities; for example in epoxy resins or meth acrylic resins, but also other precursors of polymeric phases or monomers for composites and structural adhesives.

A good homogenous dispersion is necessary for having satisfying impact performance.

The objective of the present invention is to propose a multistage polymer composition which is rapidly and easily dispersible in reactive epoxy resins, polyester resins or (meth)acrylic resins/polymers or liquid monomers or resins while having a suitable viscosity for the required application.

An objective of the present invention is also to propose a multistage polymer composition which is easily dispersible in reactive epoxy resins, polyester resins or (meth)acrylic resins/polymers or liquid monomers or resins in form of a polymer powder.

An additional objective of the present invention is to propose a multistage polymer composition in form of a dry polymer powder which is easily dispersible in reactive epoxy resins, polyester resins or (meth)acrylic resins/polymers or liquid monomers or resins.

Another objective of the present invention is to propose a method for making a multistage polymer composition which is easily dispersible in in reactive epoxy resins, polyester resins or (meth)acrylic resins/polymers or liquid monomers or resins.

Still another objective of the present invention is a method for manufacturing a dry multistage polymer composition which is easily dispersible in in reactive epoxy resins, polyester resins or (meth)acrylic resins/polymers or liquid monomers or resins.

Still an additional objective is to propose an impact modified cured resin or adhesive composition, with satisfying impact properties.

BACKGROUND OF THE INVENTION

Prior Art

The document WO2016/102666 discloses a composition comprising a multistage polymer and its method of preparation. The composition comprises as well a (meth) acrylic polymer that has a mass average molecular weight of less than 100000 g/mol.

The document WO2016/102682 discloses a multistage polymer composition and its method of preparation. The multistage polymer comprises a last stage that comprises a (meth) acrylic polymer that has a mass average molecular weight of less than 100000 g/mol The document FR 2934866 discloses polymer preparation of a specific core shell polymers with functional shell comprising hydrophilic monomers. The core shell polymers are used as impact modifier in thermoset polymers.

The document EP 1 632 533 describes a process for producing modified epoxy resin. The epoxy resin composition is having rubber like polymer particles dispersed in it by a process that brings the particles in contact with an organic medium that disperses the rubber particles.

The document EP 1 666 519 discloses a process for producing rubbery polymer particle and process for resin composition containing the same.

The document EP 2 123 711 discloses a thermosetting resin composition having a rubbery polymer particles dispersed therein and process for production thereof.

The document EP 0066382A1 discloses a bulk flowable impact modifier particles. The coagulated impact modifier particles are coated or agglomerated with hard non-elastomeric high molecular weight polymer. The hard non-elastomeric high molecular weight polymer has a viscosity average molecular weight preferably above 800000 and its weight ratio is between 0.1 and 10 wt %.

None of the prior art documents discloses a multistage polymer combined with a (meth)acrylic polymer having a medium molecular weight in selective weight ratio.

BRIEF DESCRIPTION OF THE INVENTION

Surprisingly it has been found that a polymer composition (PC1) comprising
  a) one stage (A) comprising a polymer (A1) having a glass transition temperature of less than 10° C.
  b), one stage (B) comprising a polymer (B1) having a glass transition temperature of at least 60° C. and
  c) and a polymer (C1) having a glass transition temperature of at least 30° C.
characterized in that at least the component a) and the component b) of composition (PC1) are part of a multistage polymer (MP1), and characterized in that the polymer (C1) has a mass average molecular weight Mw of at least 100000 g/mol and that the component c) represents at most 40 wt % of the composition based on a), b) and c); can be easily dispersed in a polymeric matrix material for thermosetting polymers or thermoplastic polymers or its precursors.

Surprisingly it has also been found that a method for manufacturing the polymer composition (PC1) comprising the steps of
  a) polymerizing by emulsion polymerization of a monomer or monomer mixture ($A_m$) to obtain one layer in stage (A) comprising polymer (A1) having a glass transition temperature of less than 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in a stage (C) comprising a polymer (C1) having a glass transition temperature of at least 30° C.
characterized in that the polymer (C1) has a mass average molecular weight Mw of at least 100000 g/mol and that the component c) represents at most 40 wt % of the composition based on a), b) and c); yields to a polymer composition in form of polymer particles that be easily dispersed in a polymeric matrix material for thermosetting polymers or thermoplastic polymers or its precursors.

Surprisingly it has also been found that a method for manufacturing the polymer composition (PC1) comprising the steps of
  a) polymerizing by emulsion polymerization of a monomer or monomer mixture ($A_m$) to obtain one layer in stage (A) comprising polymer (A1) having a glass transition temperature of less than 10° C.,
  b) polymerizing by emulsion polymerization of a monomer or monomer mixture ($B_m$) to obtain a layer in stage (B) comprising a polymer (B1) having a glass transition temperature of at least 60° C., both together steps a) and b) giving a multistage polymer (MP1) and step
  c) blending multistage polymer (MP1) with a polymer (C1) having a glass transition temperature of at least 30° C.
characterized in that the polymer (C1) has a mass average molecular weight Mw of at least 100000 g/mol and that the component c) represents at most 40 wt % of the composition obtained in steps a), b) and c); yields to a polymer composition in form of polymer particles that be easily dispersed in a polymeric matrix material for thermosetting polymers or thermoplastic polymers or its precursors.

Surprisingly it has also been found that a polymeric composition (PC2) comprising
  i) a polymer (P2) and
  ii) a polymer composition (PC1) comprising
    a) one stage (A) comprising a polymer (A1) having a glass transition temperature of less than 10° C.
    b), one stage (B) comprising a polymer (B1) having a glass transition temperature of at least 60° C. and
    c) and a polymer (C1) having a glass transition temperature of at least 30° C.
characterized in that at least the component a) and the component b) of composition (PC1) are part of a multistage polymer (MP1), and characterized that the polymer (C1) has a mass average molecular weight Mw of at least 100000 g/mol and that the component c) represents at most 40 wt % of the composition based on a), b) and c); possesses satisfying impact properties.

DETAILED DESCRIPTION OF THE INVENTION

According to a first aspect, the present invention relates to a polymer composition (PC1) comprising
  a) one stage (A) comprising a polymer (A1) having a glass transition temperature of less than 10° C.

b), one stage (B) comprising a polymer (B1) having a glass transition temperature of at least 60° C. and c) and a polymer (C1) having a glass transition temperature of at least 30° C.

characterized in that at least the component a) and the component b) of composition (PC1) are part of a multi-stage polymer (MP1), characterized that the polymer (C1) has a mass average molecular weight Mw of at least 100000 g/mol and that the component c) represents at most 40 wt % of the composition based on a), b) and c).

According to a second aspect, the present invention relates to a method for manufacturing the polymer composition (PC1) comprising the steps of a) polymerizing by emulsion polymerization of a monomer or monomer mixture ($A_m$) to obtain one layer in stage (A) comprising polymer (A1) having a glass transition temperature of less than 10° C.

b) polymerizing by emulsion polymerization of a monomer or monomer mixture ($B_m$) to obtain a layer in stage (B) comprising a polymer (B1) having a glass transition temperature of at least 60° C.

c) polymerizing by emulsion polymerization of a monomer or monomer mixture (Cm) to obtain a layer in stage (C) comprising a polymer (C1) having a glass transition temperature of at least 30° C.

characterized that the polymer (C1) has a mass average molecular weight Mw of at least 100000 g/mol and that the component c) represents at most 40 wt % of the composition based on a), b) and c).

In a third aspect the present invention relates to a method for manufacturing the polymer composition (PC1) comprising the steps of a) polymerizing by emulsion polymerization of a monomer or monomer mixture ($A_m$) to obtain one layer in stage (A) comprising polymer (A1) having a glass transition temperature of less than 10° C., b) polymerizing by emulsion polymerization of a monomer or monomer mixture ($B_m$) to obtain layer in stage (B) comprising a polymer (B1) having a glass transition temperature of at least 60° C., both together steps a) and b) giving a multistage polymer (MP1) and step c) blending multistage polymer (MP1) with a polymer (C1) having a glass transition temperature of at least 30° C.

characterized that the polymer (C1) has a mass average molecular weight Mw of at least 100000 g/mol and that the component c) represents at most 40 wt % of the composition obtained in steps a), b) and c).

In a fourth aspect the present invention relates to a polymeric composition (PC2) comprising i) a polymer (P2) and
ii) a polymer composition (PC1) comprising
  a) one stage (A) comprising a polymer (A1) having a glass transition temperature of less than 10° C.
  b), one stage (B) comprising a polymer (B1) having a glass transition temperature of at least 60° C. and
  c) and a polymer (C1) having a glass transition temperature of at least 30° characterized that the polymer (C1) has a mass average molecular weight Mw of at least 100000 g/mol and that the component c) represents at most 40 wt % of the composition based on a), b) and c).

By the term "polymer powder" as used is denoted a polymer comprising powder grain in the range of at least 1 µm obtained by agglomeration of primary polymer comprising particles in the nanometer range.

By the term "primary particle" as used is denoted a spherical polymer particle comprising particle in the nanometer range. Preferably the primary particle has a weight average particle size between 20 nm and 800 nm.

By the term "particle size" as used is denoted the volume average diameter of a particle considered as spherical.

By the term "thermoplastic polymer" as used is denoted a polymer that turns to a liquid or becomes more liquid or less viscous when heated and that can take on new shapes by the application of heat and pressure.

By the term "medium molecular weight" as used is denoted a mass average molecular weight Mw in the range from 100000 g/mol to 1000000 g/mol.

By the term "thermosetting polymer" as used is denoted a prepolymer in a soft, solid or viscous state that changes irreversibly into an infusible, insoluble polymer network by curing.

By the term "polymer composite" as used is denoted a multicomponent material comprising multiple different phase domains in which at least one type of phase domain is a continuous phase and in which at least one component is a polymer.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "dry" as used is denoted that the ratio of residual water is less than 1.5 wt and preferably less than 1 wt %.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

With regard to the polymer composition (PC1) according to the invention, it comprises a) a polymer (A1) having a glass transition temperature of less than 10° C., b) a polymer (B1) having a glass transition temperature of at least 60° C. and c) and a polymer (C1) having a glass transition temperature of at least 30° C.

The component c) represents at most 40 wt % of the composition based on a) b) and c). Preferably the component c) represents at most 35 wt % of the composition based on a), b) and c); more preferably at most 30 wt %, still more preferably less than 30 wt %, advantageously less than 25 wt % and more advantageously less than 20 wt %.

The component c) represents more than 4 wt % of the composition based on a), b) and c). Preferably the component c) represents more than 5 wt % of the composition based on a), b) and c); more preferably more than 6 wt %, still more preferably more than 7 wt %, advantageously more than 8 wt % and more advantageously more than 10 wt %.

The component c) represents between 4 wt % and 40 wt % of the composition based on a) b) and c). Preferably the component c) represents between 5 wt % and 35 wt % of the composition based on a), b) and c); more preferably between 6 wt % and 30 wt %, still more preferably between 7 wt % and less than 30 wt %, advantageously between 7 wt % and less than 25 wt % and more advantageously between 10 wt % and less than 20 wt %.

At least the component a) and the component b) of composition (PC1) are part of a multistage polymer (MP1).

At least the component a) and the component b) are obtained by a multistage process comprising at least two stages; and these two polymer (A1) and polymer (B1) form a multistage polymer.

The multistage polymer (MP1) of the composition (PC1) according to the invention has at least two stages that are different in its polymer composition.

The multistage polymer (MP1) is preferably in form of polymer particles considered as spherical particles. These particles are also called core shell particles. The first stage forms the core, the second or all following stages the respective shells. Such a multistage polymer which is also called core/shell particle is preferred.

The particles according to the invention, which is the primary particle, it has a weight average particle size between 15 nm and 900 nm. Preferably the weight average particle size of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles can be agglomerated giving the polymer powder of the invention.

The primary polymer particle according to the invention has a multilayer structure comprising at least one stage (A) comprising a polymer (A1) having a glass transition temperature below 10° C., at least one stage (B) comprising a polymer (B1) having a glass transition temperature over 60° C. and at least one stage (C) comprising a polymer (C1) having a glass transition temperature over 30° C.

Preferably the stage (A) is the first stage of the at least two stages and the stage (B) comprising polymer (B1) is grafted on stage (A) comprising polymer (A1) or another intermediate layer.

There could also be another stage before stage (A), so that stage (A) would also be a shell.

In a first embodiment the polymer (A1) having a glass transition temperature below 10° C. comprises at least 50 wt % of polymeric units coming from alkyl acrylate or alkyl acrylates and the stage (A) is the most inner layer of the polymer particle having the multilayer structure. In other words the stage (A) comprising the polymer (A1) is the core of the polymer particle.

With regard to the polymer (A1) of the first preferred embodiment, it is a (meth) acrylic polymer comprising at least 50 wt % of polymeric units coming from acrylic monomers. Preferably 60 wt % and more preferably 70 wt % of the polymer (A1) are acrylic monomers.

The acrylic momonomer in polymer (A1) comprises monomers chosen from C1 to C18 alkyl acrylates or mixtures thereof. More preferably acrylic monomer in polymer (A1) comprises monomers of C2 to C12 alkyl acrylic monomers or mixtures thereof. Still more preferably acrylic monomer in polymer (A1) comprises monomers of C2 to C8 alkyl acrylic monomers or mixtures thereof.

The polymer (A1) can comprise a comonomer or comonomers which are copolymerizable with the acrylic monomer, as long as polymer (A1) is having a glass transition temperature of less than 10° C.

The comonomer or comonomers in polymer (A1) are preferably chosen from (meth)acrylic monomers and/or vinyl monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 10° C.

In a specific embodiment polymer (A1) is a homopolymer of butyl acrylate.

More preferably the glass transition temperature Tg of the polymer (A1) comprising at least 70 wt % of polymeric units coming from C2 to C8 alkyl acrylate is between −100° C. and 10° C., even more preferably between −80° C. and 0° C. and advantageously between −80° C. and −20° C. and more advantageously between −70° C. and −20° C.

In a second preferred embodiment the polymer (A1) having a glass transition temperature below 10° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In a preferred embodiment the core is a butadiene homopolymer.

More preferably the glass transition temperature Tg of the polymer (A1) comprising at least 50 wt % of polymeric units coming from isoprene or butadiene is between −100° C. and 10° C., even more preferably between −90° C. and 0° C., advantageously between −80° C. and 0° C. and most advantageously between −70° C. and −20° C.

In a third preferred embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, methyl methacrylate, ethyl methacrylate, butyl methacrylate and mixtures thereof, as long as polymer (B1) is having a glass transition temperature of at least 60° C.

Advantageously the polymer (B1) comprises at least 70 wt % of monomer units coming from methyl methacrylate.

Preferably the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably the polymer (B1) is grafted on the polymer made in the previous stage.

In certain embodiments the polymer (B1) is crosslinked. In one embodiment the polymer (B1) comprises a functional comonomer. The functional copolymer is chosen from acrylic or methacrylic acid, the amides derived from this acids, such as for example dimethylacrylamide, 2-methoxyethyl acrylate or methacrylate, 2-aminoethyl acrylate or methacrylate which are optionally quaternized, polyethylene glycol (meth) acrylates, water soluble vinyl monomers such as N-vinyl pyrrolidone or mixtures thereof. Preferably the polyethylene glycol group of polyethylene glycol (meth) acrylates has a molecular weight ranging from 400 g/mol to 10 000 g/mol.

With regard to the polymer (C1), it has a mass average molecular weight Mw of at least 100000 g/mol, preferably more than 100000 g/mol, more preferably more than 105000 g/mol, still more preferably more than 110000 g/mol, advantageously more than 120000 g/mol, more advantageously more than 130000 g/mol and still more advantageously more than 140000 g/mol.

The polymer (C1), it has a mass average molecular weight Mw below 1000000 g/mol, preferably below 900000 g/mol, more preferably below 800000 g/mol, still more preferably below 700000 g/mol, advantageously below 600000 g/mol, more advantageously below 550000 g/mol and still more advantageously below 500000 g/mol and most advantageously below 450000 g/mol.

The mass average molecular weight Mw of polymer (C1) is between 100000 g/mol and 1000000 g/mol, preferable between 105000 g/mol and 900000 g/mol and more preferably between 110000 g/mol and 800000 g/mol advantageously between 120000 g/mol and 700000 g/mol, more advantageously between 130000 g/mol and 600000 g/mol and most advantageously between 140000 g/mol and 500000 g/mol.

Preferably the polymer (C1) is a copolymer comprising (meth)acrylic monomers. More preferably the polymer (C1) is a (meth) acrylic polymer. Still more preferably the polymer (C1) comprises at least 70 wt % monomers chosen from C1 to C12 alkyl (meth)acrylates. Advantageously the polymer (C1) comprises at least 80 wt % of monomers C1 to C4 alkyl methacrylate and/or C1 to C8 alkyl acrylate monomers.

Preferably the glass transition temperature Tg of the polymer (C1) is between 30° C. and 150° C. The glass transition temperature of the polymer (C1) is more preferably between 40° C. and 150° C., advantageously between 45° C. and 150° C. and more advantageously between 50° C. and 150° C.

Preferably the polymer (C1) is not crosslinked.

Preferably the polymer (C1) is not grafted on any of the polymers (A1) or (B1).

In one embodiment the polymer (C1) comprises also a functional comonomer.

The functional comonomer has the formula (1)

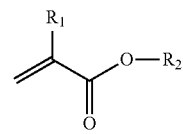

(1)

wherein $R_1$ is chosen from H or $CH_3$ and $R_2$ is H or an aliphatic oraromatic radical having at least one atom that is not C or H.

Preferably the functional monomer is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, polyethylene glycol (meth) acrylates. Preferably the polyethylene glycol group of polyethylene glycol (meth) acrylates has a molecular weight ranging from 400 g/mol to 10 000 g/mol.

In a first preferred embodiment the polymer (C1) comprises from 80 wt % to 100 wt % methyl methacrylate, preferably from 80 wt % to 99.8 wt % methyl methacrylate and from 0.2 wt % to 20 wt % of a C1 to C8 alkyl acrylate monomer. Advantageously the C1 to C8 alkyl acrylate monomer is chosen from methyl acrylate, ethyl acrylate or butyl acrylate.

In a second preferred embodiment the polymer (C1) comprises between 0 wt % and 50 wt % of a functional monomer. Preferably the meth)acrylic polymer (C1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (2) or (3)

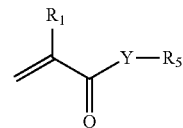

(2)

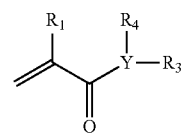

(3)

wherein in both formulas (2) and (3) $R_1$ is chosen from H or $CH_3$; and in formula (2) Y is O, $R_5$ is H or an aliphatic or aromatic radical having at least one atom that is not C or H; and in formula (3) Y is N and $R_4$ and/or $R_3$ is H or an aliphatic or aromatic radical.

Preferably the functional monomer (2) or (3) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10000 g/mol The primary polymer particle according to the invention is obtained by a multistage process comprising at least two stages. At least the component a) and the component b) of composition (PC1) are part of a multistage polymer (MP1).

Preferably the polymer (A1) having a glass transition temperature below 10° C. made during the stage (A), is made before stage (B) or is the first stage of the multistage process.

Preferably the polymer (B1) having a glass transition temperature over 60° C. made during the stage (B) is made after the stage (A) of the multistage process.

In a first preferred embodiment the polymer (B1) having a glass transition temperature of at least 30° C. is an intermediate layer of the polymer particle having the multilayer structure.

Preferably the polymer (C1) having a glass transition temperature over 30° C. made during the stage (C) is made after the stage (B) of the multistage process.

More preferably the polymer (C1) having a glass transition temperature over 30° C. made during the stage (C) is the external layer of the primary polymer particle having the multilayer structure.

There could be additional intermediate stages, either between stage (A) and stage (B) and/or between stage (B) and stage (C).

The polymer (C1) and the polymer (B1) are not the same polymer, even if their composition could be very close and some of their characteristics are overlapping. The essential difference is that the polymer (B1) is always part of the multistage polymer (MP1).

This is more explained in the process for preparing the composition according to the invention comprising the polymer (C1) and the multi stage polymer.

The weight ratio r of the polymer (C1) of the external layer comprised in stage (C) in relation to the complete polymer particle is at least 5 wt %, more preferably at least 7 wt % and still more preferably at least 10 wt %.

According to the invention the ratio r of the external stage (C) comprising polymer (C1) in relation to the complete polymer particle is at most 30 w %.

Preferably the ratio of polymer (C1) in view of the primary polymer particle is between 5 wt % and 30 wt % and preferably between 5 wt % and 20 wt %.

In a second preferred embodiment the polymer (B1) having a glass transition temperature of at least 30° C. is the external layer of the primary polymer particle having the multilayer structure in other words the multistage polymer (MP1).

Preferably at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). More preferably at least 50 wt % of polymer (B1) is grafted. The ratio of grafting can be determined by extraction with a solvent for the polymer (B1) and gravimetric measurement before and after extraction to determine the non-grafted quantity.

The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages. The polymer (C1) can be extracted for estimating and measuring the glass transition temperature Tg.

Preferably the polymer composition of the invention comprises no solvents. By no solvents is meant that eventually present solvent make up less than 1 wt % of the composition. The monomers of the synthesis of the respective polymers are not considered as solvents. The residual monomers in the composition present less than 2 wt % of the composition.

Preferably the polymer composition according to the invention is dry. By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The composition according to the invention comprising the does not comprise any voluntary added solvent. Eventually residual monomer from the polymerization of the respective monomers and water are not considered as solvents.

With regard to a first preferred method for manufacturing the polymer composition (PC1) according to the invention it comprises the steps of
  a) polymerizing by emulsion polymerization of a monomer or monomer mixture ($A_m$) to obtain one layer in stage (A) comprising polymer (A1) having a glass transition temperature of less than 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.
characterized that the polymer (C1) has a mass average molecular weight Mw of at least 100000 g/mol and that the component c) represents at most 30 wt % of the composition based on a) b) and c).

Preferably the step a) is made before step b).

More preferably step b) is performed in presence of the polymer (A1) obtained in step a).

Advantageously the first preferred method for manufacturing the polymer composition (PC1) according to the invention is a multistep process comprises the steps one after the other of
  a) polymerizing by emulsion polymerization of a monomer or monomer mixture ($A_m$) to obtain one layer in stage (A) comprising polymer (A1) having a glass transition temperature of less then 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.
characterized that the polymer (C1) has a mass average molecular weight Mw of at least 100000 g/mol.

Preferably the steps a), b) and c) are performed in that order.

The respective monomers or monomer mixtures ($A_m$), ($B_m$) and ($C_m$) for forming the layers (A), (B) and (C)

respectively comprising the polymers (A1), (B1) and (C1) respectively, are the same as defined before. The characteristics of the polymers (A1), (B1) and (C1) respectively, are the same as defined before.

Preferably the first preferred method for manufacturing the polymer composition according to the invention comprises the additional step d) of recovering of the polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition according to the present invention if the polymer (A1) having a glass transition temperature below 10° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 10° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1% of humidity or water.

The humidity of a polymer composition can be measure with a thermo balance.

The drying of the polymer can be made in an oven or vacuum oven with heating of the composition for 48 hours at 50° C.

With regard to a second preferred method for manufacturing the polymeric composition (PC1) comprising the polymer (C1) and the multi stage polymer (MP1), it comprises the steps of
 a) mixing or blending of the polymer (C1) and the multi stage polymer (MP1),
 b) optionally recovering the obtained mixture of previous step in form of a polymer powder,
wherein the polymer (C1) and the multi stage polymer (MP1) in step a) are in form of a dispersion in aqueous phase.

The multi stage polymer (MP1) of the second preferred method for manufacturing the polymeric composition (PC1) is made according the first preferred method without performing step c) of the said first preferred method.

The quantities of the aqueous dispersion of the polymer (C1) and the aqueous dispersion of the multi stage polymer (MP1) are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the polymer (C1) and the aqueous dispersion of the multi stage polymer (MP1) are chosen in a way that the weight ratio of the multi stage polymer based on solid part only in the obtained mixture is at most 99 wt %, preferably at most 95 wt % and more preferably at most 90 wt %.

The quantities of the aqueous dispersion of the polymer (C1) and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The polymer composition (PC1) is obtained as an aqueous dispersion of the polymer particles, if recovering step b) takes not place. The solid content of the dispersion is between 10 wt % and 65 wt %.

In one embodiment the recovering step b) of the process for manufacturing the polymer composition comprising the polymer (C1) and the multi stage polymer (MP1), is not optional and is preferably made by coagulation or by spray drying.

The process of the second preferred method for manufacturing the polymer composition (PC1) comprising the polymer (C1) and the multi stage polymer can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The second preferred method for manufacturing the polymer composition comprising the polymer (C1) and the multi stage polymer yields preferably to a polymer powder. The polymer powder of the invention is in form of particles. A polymer powder particle comprises agglomerated primary polymer particles made by multistage process and the polymer (C1).

As already mentioned the polymer composition (PC1) according to the invention can also be in form of larger polymer particles: a polymer powder. The polymer powder particle comprises agglomerated primary polymer particles made by the multistage process according the first preferred method or agglomerated primary polymer particles made by blending the multistage polymer (MP1) obtained multistage process with polymer particles made of polymer (C1) according the second preferred method.

With regard to the polymer powder of the invention, it has a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is at least 7 μm and preferably 10 μm.

The D90 of the particle size distribution in volume is at most 500 μm and preferably 400 μm, more preferably at most 350 μm and advantageously at most 250 μm.

The present invention relates also to the use of the polymer composition (PC1) in form of the polymer powder according to the invention as an impact modifier in polymers, in order to obtain an impact modified polymer composition. Preferably the polymers are thermosetting polymers or thermoplastic polymers or its precursors.

The present invention relates also to the use of the polymer composition (PC1) in form of the polymer powder according to the invention as an impact modifier in structural adhesives.

Preferably the adhesives are thermosetting polymers of epoxy type or (meth)acrylic type.

With regard to the impact modified polymer composition (PC2) according to the invention it comprises
i) an polymer (P2) and
ii) a polymer composition (PC1) comprising
a) one stage (A) comprising a polymer (A1) having a glass transition temperature of less then 10° C.
b), one stage (B) comprising a polymer (B1) having a glass transition temperature of at least 60° C. and
c) a polymer (C1) having a glass transition temperature of at least 30° C.
characterized that the polymer (C1) has a mass average molecular weight Mw of at least 100000 g/mol.

The preferred and advantageously variants of the method for manufacturing the polymer composition (PC1) obtained by the multistage process or by blending are the same as defined before.

The respective stages (A) and (B) and the polymers (A1), (B1) and (C1) respectively, are the same as defined before.

The impact modified polymer composition (PC2) according to the invention comprises between 1 wt % and 50 wt % of polymer composition (PC1).

The polymer (P2) can be a thermoset polymer or its precursor, or a thermoplastic polymer. The polymer (P2) can also be an adhesive and more preferably a structural adhesive.

With regard to the thermoset polymers mention may be made, by way of examples, of unsaturated polyesters resins, polyacrylics, polyurethanes, cyanoacrylates, bismaleimides and epoxy resins crosslinked by a hardener.

With regard to the thermoplastic polymers mention may be made by way of example of (meth)acrylic polymers or polyesters.

With regard to the epoxy resin polymer, mention may be made of: resorcinol diglycidyl ether, bisphenol A diglycidyl ether, triglycidyl-p-amino-phenol, bromobisphenol F diglycidyl ether, the triglycidyl ether of m-amino-phenol, tetraglycidylmethylenedianiline, the triglycidyl ether of (trihydroxy-phenyl)methane, polyglycidyl ethers of phenol-formaldehyde novolak, poly-glycidyl ethers of ortho-cresol novolak and tetraglycidyl ethers of tetraphenyl-ethane. Mixtures of at least two of these resins can also be used.

The epoxy resin composition according to the invention it comprises between 1 wt % and 50 wt %, preferably between 2 wt % and 30 wt % and more preferably between 5 and 20% of polymer obtained by the multistage process.

[Methods of Evaluation]

Glass transition Temperature

The glass transitions (Tg) of the polymers are measured with equipment able to realize a thermo mechanical analysis. A RDAII "RHEOMETRICS DYNAMIC ANALYSER" proposed by the Rheometrics Company has been used. The thermo mechanical analysis measures precisely the viscoelastics changes of a sample in function of the temperature, the strain or the deformation applied. The apparatus records continuously, the sample deformation, keeping the stain fixed, during a controlled program of temperature variation. The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer from Malvern.

The particle size of the polymer powder after recovering is measured with Malvern Mastersizer 3000 from MALVERN. For the estimation of weight average powder particle size, particle size distribution and ratio of fine particles a Malvern Mastersizer 3000 apparatus with a 300 mm lenses, measuring a range from 0,5-880 µm is used.

The invention claimed is:

1. A polymer composition (PC1) comprising:
a) one stage (A) comprising a polymer (A1) having a glass transition temperature of less than 10° C.,
b) one stage (B) comprising a polymer (B1) having a glass transition temperature of at least 60° C., and
c) and a polymer (C1) is a (meth)acrylic polymer(s) comprising at least 80 wt % of monomers chosen from the group consisting of C1 to C4 alkyl methacryate and C1 to C8 alkyl acrylate monomers and having a glass transition temperature of at least 30° C.,
wherein at least the component a) and the component b) of composition (PC1) are part of a multistage polymer (MP1), and wherein the polymer (C1) has a mass average molecular weight Mw of at least 100,000 g/mol and below 700,000 and the component c) represents more than 10 wt % and less than 25 wt % of the composition based on a) b) and c).

2. The polymer composition according to claim 1, wherein polymer (C1) has a mass average molecular weight Mw between 140,000 g/mol and 500,000 g/mol.

3. The polymer composition according to claim 1, wherein component c) represents between 10 wt % and less than 20 wt % of the composition based on a), b), and c).

4. The polymer composition according to claim 1, wherein stage (A) is a first stage and stage (B) comprising polymer (B1) is grafted on stage (A) comprising polymer (A1).

5. The polymer composition according to claim 1 wherein polymer (C1) comprises a functional comonomer.

6. The polymer composition according to claim 5 wherein the functional monomer is chosen from glycidyl (meth)acrylate, acrylic acid, methacrylic acid, amides derived from these acids, dimethylacrylamide, 2-methoxyethyl acrylate or methacrylate, 2-aminoethyl acrylates, 2-aminomethacrylates optionally quaternized, and polyethylene glycol (meth)acrylates.

7. The polymer composition according to claim 1 wherein polymer (B1) is crosslinked.

8. The polymer composition according to claim 1 wherein polymers (B1) and (C1) are acrylic or methacrylic polymers.

9. The polymer composition according to claim 1 wherein polymer (A1) comprises butadiene as monomer.

10. The polymer composition according to claim 1 wherein polymers (A1), (B1) and (C1) are acrylic or methacrylic polymers.

11. The polymer composition according to claim 10, wherein at least 80 wt % the acrylic or methacrylic momonomers of the polymers (A1), (B1) or (C1) are chosen from methyl acrylate, propyl acrylate, isopropyl acrylate, butyl acrylate, tert-butyl acrylate, methyl methacrylate, ethyl methacrylate, butyl methacrylate, and mixtures there of.

12. A method for manufacturing the polymer composition according to claim 1 comprising the steps of:
   a) polymerizing by emulsion polymerization of a monomer or monomer mixture ($A_m$) to obtain one layer in stage (A) comprising polymer (A1) having a glass transition temperature of less than 10° C.,
   b) polymerizing by emulsion polymerization of a monomer or monomer mixture ($B_m$) to obtain layer in stage (B) comprising a polymer (B1) having a glass transition temperature of at least 60° C.,
   c) polymerizing by emulsion polymerization of a monomer or monomer mixture (Cm) to obtain a layer in stage (C) comprising a polymer (C1) which is a (meth) acrylic polymer comprising at least 80 wt % of monomers selected from the group consisting of C1 to C4 alkyl methacrylate and C1 to C8 alkyl acrylate monomers and having a glass transition temperature of at least 30° C.,
wherein polymer (C1) has a mass average molecular weight Mw of at least 100,000 g/mol and below 700,000 g/mol and component c) represents more than 10 wt % and less than 25 wt % of the composition based on a), b) and c).

13. A method for manufacturing polymer composition (PC1) according to claim 1 comprising the steps of:
   a) polymerizing by emulsion polymerization of a monomer or monomer mixture ($A_m$) to obtain one layer in stage (A) comprising polymer (A1) having a glass transition temperature of less than 10° C.,
   b) polymerizing by emulsion polymerization of a monomer or monomer mixture ($B_m$) to obtain layer in stage (B) comprising a polymer (B1) having a glass transition temperature of at least 60° C.,
   both together steps a) and b) giving a multistage polymer (MP1), and
   c) blending multistage polymer (MP1) with a polymer (C1) which is a (meth) acrylic polymer comprising at least 80 wt % of monomers selected from the group consisting of C1 to C4 alkyl methacrylate and C1 to C8 alkyl acrylate monomers and having a glass transition temperature of at least 30° C.,
wherein polymer (C1) has a mass average molecular weight Mw of at least 100,000 g/mol and below 700,000 g/mol and component c) represents more than 10 wt % and less than 25 wt % of the composition obtained in steps a), b) and c).

14. The method according to claim 12 wherein step a) is made before step b).

15. The method according to claim 12 wherein step b) is performed in presence of the polymer (A1) obtained in step a).

16. The method according to claim 12 wherein steps a), b) and c) are performed in that order.

17. The method according to claim 12 wherein the method comprises additional step d): recovering of the polymer composition.

18. The method according to claim 17, wherein step d) is made by coagulation or by spray-drying.

19. The method according to claim 12 wherein polymer (C1) has a mass average molecular weight Mw between 140,000 g/mol and 500,000 g/mol.

20. The method according to claim 12 wherein component c) represents between 10 wt % and less than 20 wt % of the composition based on a), b), and c).

21. A polymer composition (PC2) comprising:
   i) a polymer (P2), and
   ii) a polymer composition (PC1) comprising:
      a) one stage (A) comprising a polymer (A1) having a glass transition temperature of less than 10° C.,
      b), one stage (B) comprising a polymer (B1) having a glass transition temperature of at least 60° C., and
      c) a polymer (C1) is a (meth) acrylic polymer comprises at least 80 wt % of monomers selected from the group consisting of C1 to C4 alkyl methacrylate and C1 to C8 alkyl acrylate monomers and having a glass transition temperature of at least 30° C.,
   wherein polymer (C1) has a mass average molecular weight Mw of at least 100,000 g/mol and below 700,000 g/mol and component c) represents more than 10 wt % and less than 25 wt % of the composition based on a), b) and c).

22. The polymer composition according to claim 21, wherein polymer composition (PC1) is made according to a method comprising the steps of:
   a) polymerizing by emulsion polymerization of a monomer or monomer mixture (Am) to obtain one layer in stage (A) comprising polymer (A1) having a glass transition temperature of less than 10° C.,
   b) polymerizing by emulsion polymerization of a monomer or monomer mixture (Bm) to obtain layer in stage (B) comprising a polymer (B1) having a glass transition temperature of at least 60° C.,
   both together steps a) and b) giving a multistage polymer (MP1), and
   c) blending multistage polymer (MP1) with a polymer (C1) which is a (meth) acrylic polymer comprising at least 80 wt % of monomers selected from the group consisting of C1 to C4 alkyl methacrylate and C1 to C8 alkyl acrylate monomers and having a glass transition temperature of at least 30° C.,
   wherein polymer (C1) has a mass average molecular weight Mw of at least 100,000 g/mol and below 700,000 g/mol and component c) represents more than 10 wt % and less than 25 wt % of the composition obtained in steps a), b) and c).

23. The polymer composition according to claim 21 wherein polymer (P2) is thermoset polymer or its precursor, or a structural adhesive.

24. The polymer composition according to claim 21 wherein polymer (C1) has a mass average molecular weight Mw between 140,000 g/mol and 500,000 g/mol.

25. The polymer composition according to claim 21 wherein component c) represents between 10 wt % and less than 20 wt % of the composition based on a), b), and c).

* * * * *